(12) United States Patent
Liu et al.

(10) Patent No.: US 8,126,894 B2
(45) Date of Patent: Feb. 28, 2012

(54) CLICK CHAIN MODEL

(75) Inventors: Chao Liu, Bellevue, WA (US); Yi-Min Wang, Bellevue, WA (US); Fan Guo, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 12/327,783

(22) Filed: Dec. 3, 2008

(65) Prior Publication Data

US 2010/0138410 A1 Jun. 3, 2010

(51) Int. Cl.
*G06F 7/00* (2006.01)
*G06F 17/30* (2006.01)

(52) U.S. Cl. ........................................ 707/738; 707/749
(58) Field of Classification Search .......... 707/720–725, 707/738, 749; 715/760–765
See application file for complete search history.

(56) References Cited

U.S. PATENT DOCUMENTS

| | | | |
|---|---|---|---|
| 7,249,126 B1 | 7/2007 | Ginsburg | |
| 2006/0206460 A1 | 9/2006 | Gadkari | |
| 2006/0259480 A1 | 11/2006 | Zhang | |
| 2007/0208730 A1 | 9/2007 | Agichtein | |
| 2007/0255689 A1 | 11/2007 | Sun | |
| 2007/0266025 A1 | 11/2007 | Wagner | |
| 2008/0244428 A1* | 10/2008 | Fain | 715/764 |
| 2009/0094196 A1* | 4/2009 | Piwowarski et al. | 707/3 |
| 2010/0082421 A1* | 4/2010 | Tuladhar et al. | 705/14.41 |
| 2010/0125570 A1* | 5/2010 | Chapelle et al. | 707/722 |

OTHER PUBLICATIONS

Joachims et al.; Search Engines that Learn from Implicit Feedback; Computer, vol. 40 Issue 8; Aug. 2007.
Radlinski et al.; Active Exploration for Learning Rankings from Clickthrough Data; KDD '07 Proceedings of the 13th ACM SIGKDD international conference on Knowledge discovery and data mining; Aug. 2007 pp. 570-579.
Chakrabarti et al.; Contextual Advertising by Combining Relevance with Click Feedback; WWW '08 Proceeding of the 17th international conference on World Wide Web; 2008.
Hila Becker; Modeling Contextual Factors of Click Rates; In Proceedings of the Twenty-Second AAAI Conference on Artificial Intelligence; Jul. 22-26, 2007.
Agichtein et al.; Improving web search ranking by incorporating user behavior information; ISIGIR '06 Proceedings of the 29th annual international ACM SIGIR conference on Research and development in information retrieval; 2006.
Agichtein et al.; Learning user interaction models for predicting web search result preferences; SIGIR '06 Proceedings of the 29th annual international ACM SIGIR conference on Research and development in information retrieval; 2006.
Burges et al.; Learning to rank using gradient descent; ICML '05 Proceedings of the 22nd international conference on Machine learning; 2005.
Craswell et al.; An experimental comparison of click position-bias models; In WSDM '08: Proceedings of the international conference on Web search and web data mining; 2008.

(Continued)

*Primary Examiner* — Usmaan Saeed
*Assistant Examiner* — Navneet K Ahluwalia

(57) ABSTRACT

Techniques are described for generating a statistical model from observed click chains. The model can be used to compute a probability that a document is relevant to a given search query. With the model, a probability of a user examining a given document in a given search result conditionally depends on: a probability that a preceding document in the given search result is examined by a user viewing the given search result; a probability that the preceding document is clicked on by a user viewing the given search result, which conditionally depends directly on the probability that the preceding document is examined and on a probability of relevance of the preceding document.

19 Claims, 8 Drawing Sheets

OTHER PUBLICATIONS

Ghosh et al.; Externalities in online advertising; WWW '08: Proceeding of the 17th international conference on World Wide Web, pp. 161-168; 2008.

Joachims et al.; Optimizing search engines using clickthrough data; KDD '02: Proceedings of the eighth ACM SIGKDD international conference on Knowledge discovery and data mining; 2002.

Joachims et al; Accurately interpreting clickthrough data as implicit feedback; SIGIR '05: Proceedings of the 28th annual international ACM SIGIR conference on Research and development in information retrieval, pp. 154-161; 2005.

Joachims et al.; Evaluating the accuracy of implicit feedback from clicks and query reformulations in web search; ACM Trans. Inf. Syst., 25(2):7, ACM Transactions on Information Systems (TOIS) TOIS Homepage archive vol. 25 Issue 2; Apr. 2007.

Minka et al.; Click chain model sample; 2009.

Minka et al.; Infer.Net—a next generation inference framework; Proceedings of the 18th international conference on World wide web, 2009.

Minka et al.; Expectation propagation for approximate Bayesian inference; In UAI '01: Proceedings of the 17th Conference in Uncertainty in Artificial Intelligence, 2001.

Radlinksi et al.; Query chains: learning to rank from implicit feedback; In KDD '05: Proceedings of the eleventh ACM SIGKDD international conference on Knowledge discovery in data mining, 2005.

Wang et al.; Pskip: Evaluating the ranking quality of a sorted list; KDD'09, Jun. 28-Jul. 1, 2009, Paris, France.

Xue et al.; Optimizing web search using web click-through data; Proceedings of the thirteenth ACM international conference on Information and knowledge management 2004.

Piwowarski et al.; Predictive User Click Models Based on Clickthrough History; Proceedings of the sixteenth ACM conference on Conference on information and knowledge management; Nov. 2007.

Shokouhi et al.; Investigating the Effectiveness of Clickthrough Data for Document Reordering; Computer Science Advances in Information Retrieval Lecture Notes in Computer Science, 2008, vol. 4956/2008, 591-595.

\* cited by examiner

Start

After I₁

$d_3$

After I₂

After I₃

US 8,126,894 B2

CLICK CHAIN MODEL

BACKGROUND

Some search engines log which documents are clicked for particular queries. These query click logs are a rich source of information in the search business, because they reflect users' preference over the documents presented by a search engine. In addition to being first-party judgments, click logs are useful because they easily outweigh human judges' third-party judgments in terms of both query coverage and quantity. One way to leverage query click logs is to infer the user-perceived relevance of each document with respect to the query that elicited the document. However, while valuable for many applications, inference of document relevance from user clicks is a difficult problem to solve. There may be numerous ad hoc approaches to deriving document relevance, e.g., the more clicks a document receives the more relevant it is, but the effectiveness of such ad hoc approaches is limited because of the lack of theoretical foundations, unpredictable performance in reality, and maintenance difficulties. What is needed is a principled approach to inferring document relevance from user click logs.

Techniques related to click chain modeling are described below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques are described for generating a statistical model from observed click chains. The model can be used to compute a probability that a document is relevant to a given search query. With the model, a probability of a user examining a given document in a given search result conditionally depends on: a probability that a preceding document in the given search result is examined by a user viewing the given search result; a probability that the preceding document is clicked on by a user viewing the given search result, which conditionally depends directly on both the probability that the preceding document is examined and on the probability of the preceding document being perceived as relevant by the user for the given query.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments described herein relate to a graphical model and an inference algorithm based on the graphical model. Together they will be referred to as a Click Chain Model (CCM). The CCM mathematically models web users' click behaviors.

Figure 1:
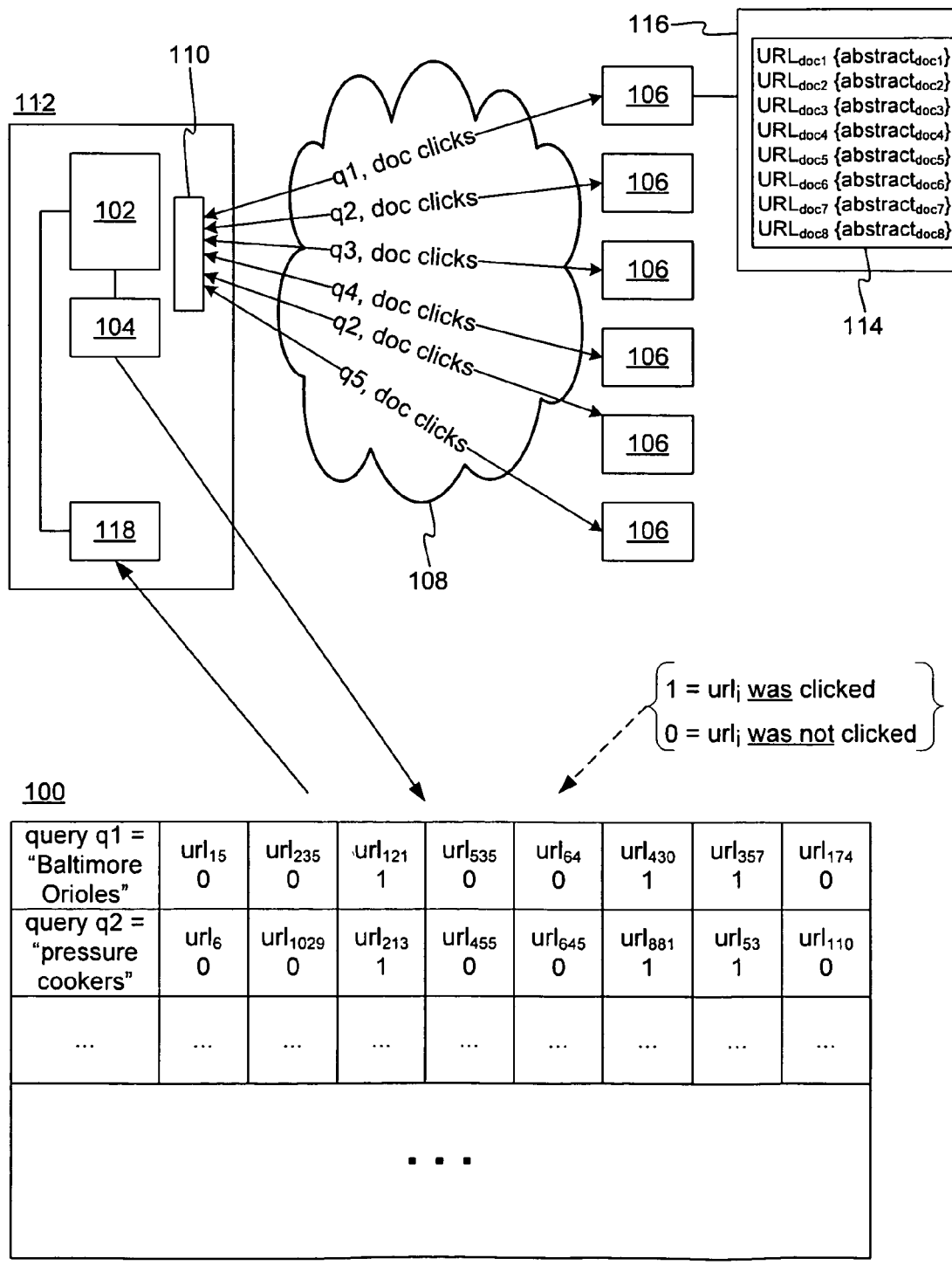
FIG. 1 shows a system for modeling a click log for a search engine.

FIG. 1 shows a system for modeling a click log 100 for search engine 102. The search engine 102 may be any variety of known search engines which generally index a set of documents, receive queries for the documents, and rank matching documents by computing relevancies of the documents to the queries. A web server (not shown) may work in conjunction with the search engine 102.

The click log 100 has click entries, each having a particular query (e.g., the search terms of the query) and an ordering, by relevance, of which documents were found by a search engine 102 to be relevant to its query. A click entry also indicates which of its documents were clicked by a user viewing the documents in a search result for the query. In the example of FIG. 1, a query of "Baltimore Orioles" returned 8 specific URLs ($url_{15}, \ldots, url_{174}$) and a user who viewed the documents after submitting the query was recorded to have clicked on 3 documents; $url_{121}$, $url_{430}$, and $url_{357}$. The click log 100 may be generated by a logging module 104 observing session activity directed to the search engine 102 and logging queries and subsequent clicks. The queries may be transmitted from various clients 106, for example web browsers or other applications for accessing the search engine 102. The queries, as well as clicks on result documents, are transmitted over a network 108 between the clients 106 and a network interface 110 of a server computer 112. The server computer 112 and search engine 102 may in practice be distributed across multiple server computers. A client 106 may display a search result 114 on a display 116. As will be described in detail below, an inference engine uses the click log 100 to generate a statistical model of the click log 100 which can be used to compute relevancies of documents to queries. The relevancies can be used by the search engine 102. Relevancies output by the inference engine 118 may be used for other purposes, for example for online advertising.

Figure 2:
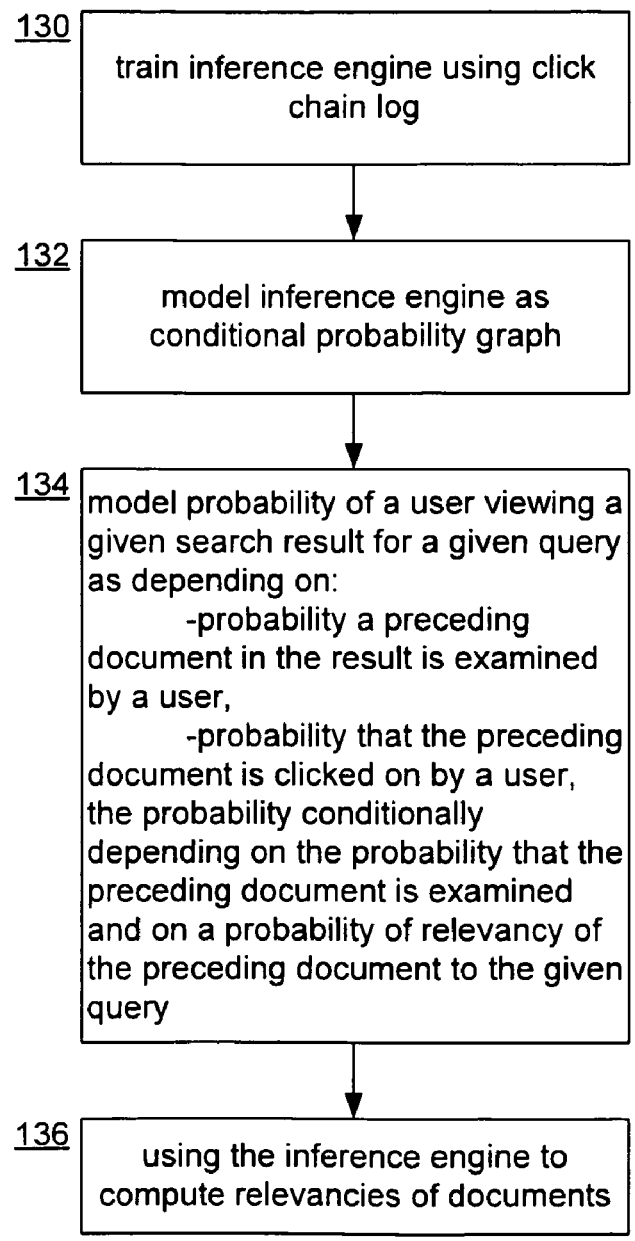
FIG. 2 shows a general process for modeling click logs to obtain relevancies.

FIG. 2 shows a general process for modeling click logs to obtain relevancies. Initially, a statistical inference engine is trained 130 using a click chain log. The click chain log indicates which documents at which respective order positions of a corresponding particular search result were clicked or not clicked by a user who viewed the particular search result. The inference engine is modeled 132 as a conditional dependency graph. For a given search result for a given query, a probability of a user examining a given document in the given search result is modeled 134 as conditionally depending on probabilities of other variables, for example: a probability that a preceding document in the given search result is examined by a user viewing the given search result; a probability that the preceding document is clicked on by a user viewing the given search result, which conditionally depends directly on both the probability that the preceding document is examined and on the probability of the preceding document being perceived as relevant by the user with respect to the given query. The trained inference engine may then be used to compute 136 relevancies of documents. To further understand the inferences, looking ahead to graph 158 in FIG. 5, note that whether a document is viewed or not, or clicked or not, $E_i$, $C_i$, and $S_i$ will still exist in the model. The clicked or not-clicked status decides whether $C_i=1$ or 0, and $P(E_i=1)$ is inferred from the CCM, as $E_i$ and $S_i$ are hidden (i.e., unobserved) variables.

Figure 3:
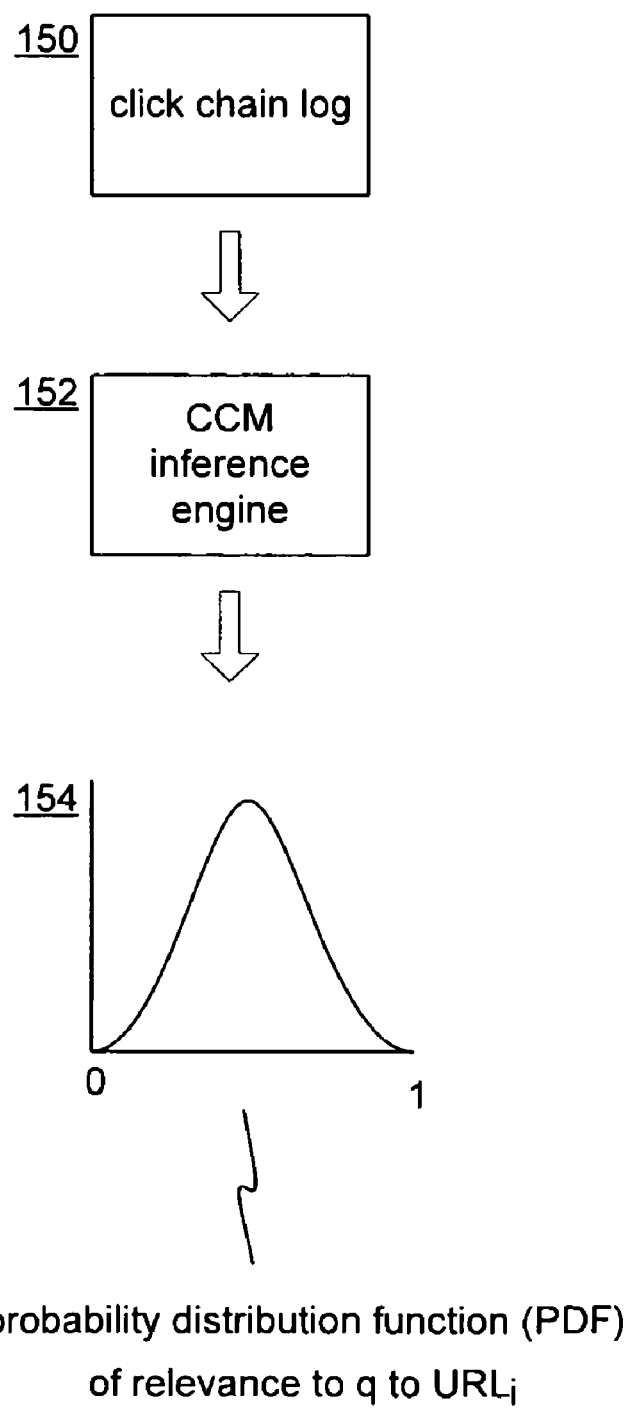
FIG. 3 shows input and output for an inference engine.

FIG. 3 shows input and output for an inference engine 152. A CCM inference engine receives a click chain log 150. For any given query q submitted to the inference engine, the inference engine in effect generates probability distribution functions 154 of relevance of q to various URLs (documents).

Mathematical Context

As mentioned previously, the CCM described herein mathematically models web users' click behaviors. Given a set of documents {d}, each document $d_i$ is assigned three random variables $E_i$, $C_i$ and $R_i$, which respectively denote whether $d_i$ is examined, whether it is clicked, and how relevant $d_i$ is with respect to the query that elicits $d_i$. Given user click logs, $C_i$'s are observed, and a probability of $d_i$ being perceived as relevant by the user with respect to the query may be inferred by calculating the posterior for each $R_i$, i.e., $P(R_i|D)$, where D represents the click data. Once $P(R_i|D)$ is derived, a number of applications may be improved. For example, by taking the distribution mean and variance of D as the user-perceived relevance of $d_i$ (and confidence), documents may be re-ranked for improved search quality, etc.

The CCM described herein may benefit from a simplified model that enables derivation of a closed form (i.e., exact inference) of $P(R_i|D)$). Previous click chain approaches have used approximate algorithms (e.g., Expectation Propagation and Variational Message Passing) to infer relevance. Approximate algorithms may not guarantee convergence to the true posterior. Approximate algorithms are usually slow and therefore do not scale well. Furthermore, approximate algorithms are generally not suited for incremental updates (i.e., updating with incremental additions of data).

In contrast to approximate algorithms, an exact inference obtains the true posterior distribution because it gives the closed form of $P(R_i|D)$. Therefore, the inference CCM described herein should be precise. Consider U click chains of maximum length M, where there are N total distinct documents in the U click chains. Each CCM is query-dependent, so N≈cM<<UM, where c is a constant. Assuming a conservative case of M=10 and N=100, then consider the following. A CCM stores a (2M+2)×N integer matrix, so a CCM for each query takes 8K memory. If there are 1 million queries, all the CCMs can be stored in the memory of a regular desktop (~8 gigabits). Furthermore, in view of the closed form, during training process, the query click log can be scanned to memory once and increment the corresponding count in at most two cells for each click chain. The training time may be in linear proportion to the number of click chains (training data) available. Also, when new click chain data is to be incorporated, the model may be updated simply by incrementing the corresponding count in the same way as model training. Finally, the training and model update can be easily distributed to multiple machines; since it involves only incremental updating. Consequently, a MapReduce (described elsewhere) infrastructure may be avoided.

Problem Definition

This section sets forth a formal definition of the problem of inferring document relevance from query click logs. When a search user submits a query q to a particular search engine, a list of ranked documents $D=\{d_1, d_2, \ldots, d_M\}$ is returned. Based on the assumption that the first search engine result page (SERP) usually includes the top-10 documents (i.e., URLs), it is may be assumed that M=10. After examining the results D, the user may choose to click any document among D. A resulting click log entry may be generated and logged. The click log entry may be of the form $C=\{c_1, c_2, \ldots, c_m\}$, where $c_i$ is set to 1 if $d_i$ is clicked, and 0 otherwise (i.e., if the i-th document is clicked, the i-th c is set to 1). Given a set of U click log entries from U users for the same SERP D, the problem of inferring document relevance may be stated as: what is the relevance of each $d_i$ (i=1, 2, ..., M) with respect to the query q?

The above formulation of the problem is somewhat simplified and does not take into account cases where, as a search engine evolves, the SERP D may differ over time for the same query q. As will be seen after the following discussion of the basic CCM, which focuses on inference from multiple click log entries on the same SERP, the CCM can be extended to handle cases with different SERPs.

Basic CCM

User Behavioral Model

Figure 4:
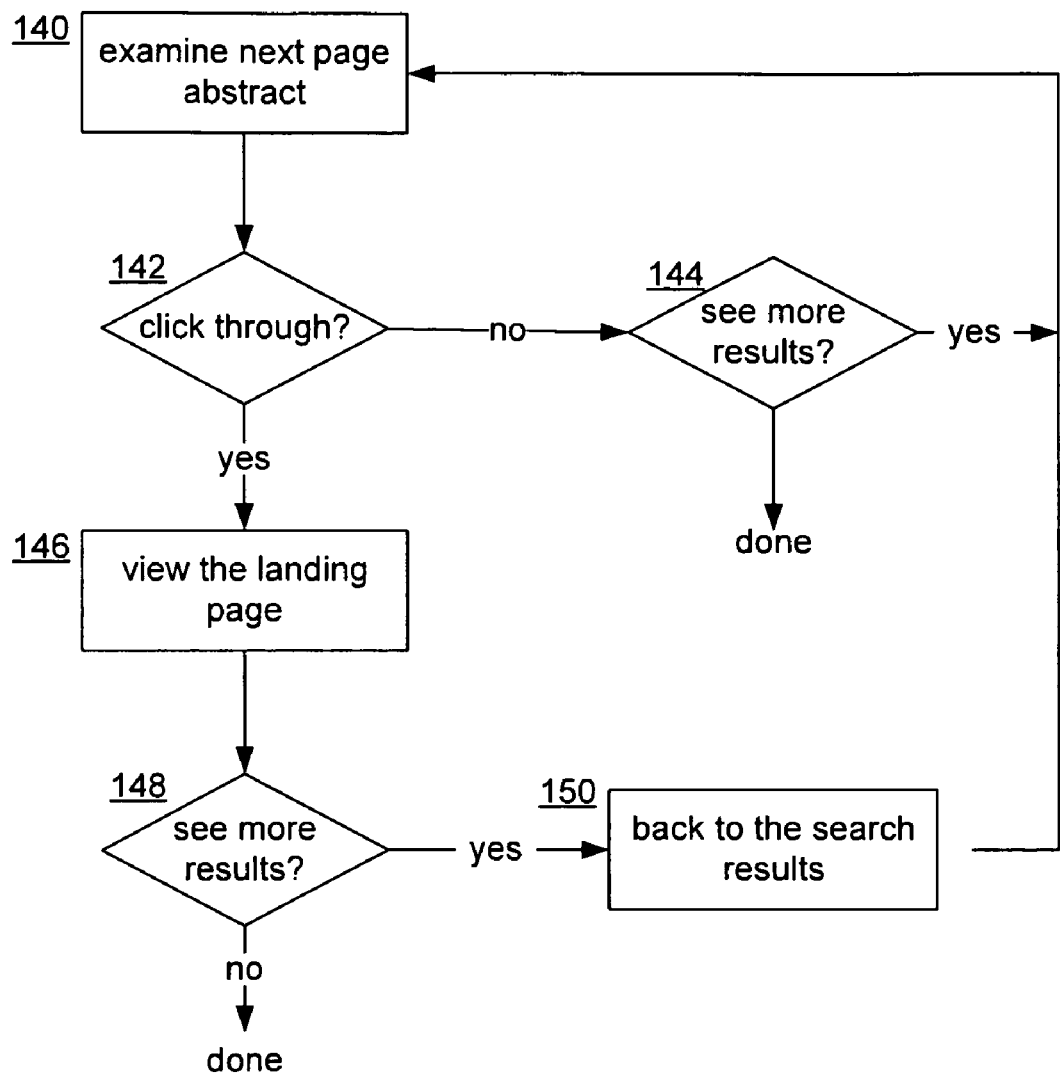
FIG. 4 shows search user behavior captured for a click chain model.

FIG. 4 shows search user behavior captured for a click chain model. The CCM leverages captured behavior of search users. Such behavior may be modeled in the following way. Assuming that a SERP displays summaries of the returned documents for a query, first, a web search user examines 140 the SERP in a top-down fashion, starting with the first document. Supposing the user is at the i-th position, i.e., examining the summary or abstract of $d_i$, if 142 the user chooses not to click $d_i$ (no click through) the user is said to have a probability of $\alpha_1$ to see more results 144 (i.e., examine $d_{i+1}$). However, if 142 the user clicks $d_i$ and views 146 the landing page, then whether 148 the user will come back to the search results 150 and examine $d_{i+1}$ now depends on how relevant $d_i$ is. Suppose the user will examine $d_{i+1}$ with probabilities of $\alpha_2$ and $\alpha_3$ if $d_i$ is completely irrelevant and relevant, respectively. By default, we set $\alpha_1=0.6$, $\alpha_2=0.8$, and $\alpha_3=0.3$. Note that the exact values of $\alpha_1$, $\alpha_2$, and $\alpha_3$ may depend on the particular data used. They may be derived from the data based on the maximum likelihood principle, for example. However, the values provided herein may be used as reasonable defaults for those who would avoid deriving the value from data. In general, it is desirable to have $\alpha_3 \leq \alpha_1 \leq \alpha_2$, because people are more likely to stop upon finding a relevant result (hence $\alpha_3$ is the smallest), and because people who click a document but find it irrelevant are more likely to click the next document than those people who decide not to click the current document (hence $\alpha_1 \leq \alpha_2$).

Figure 5:
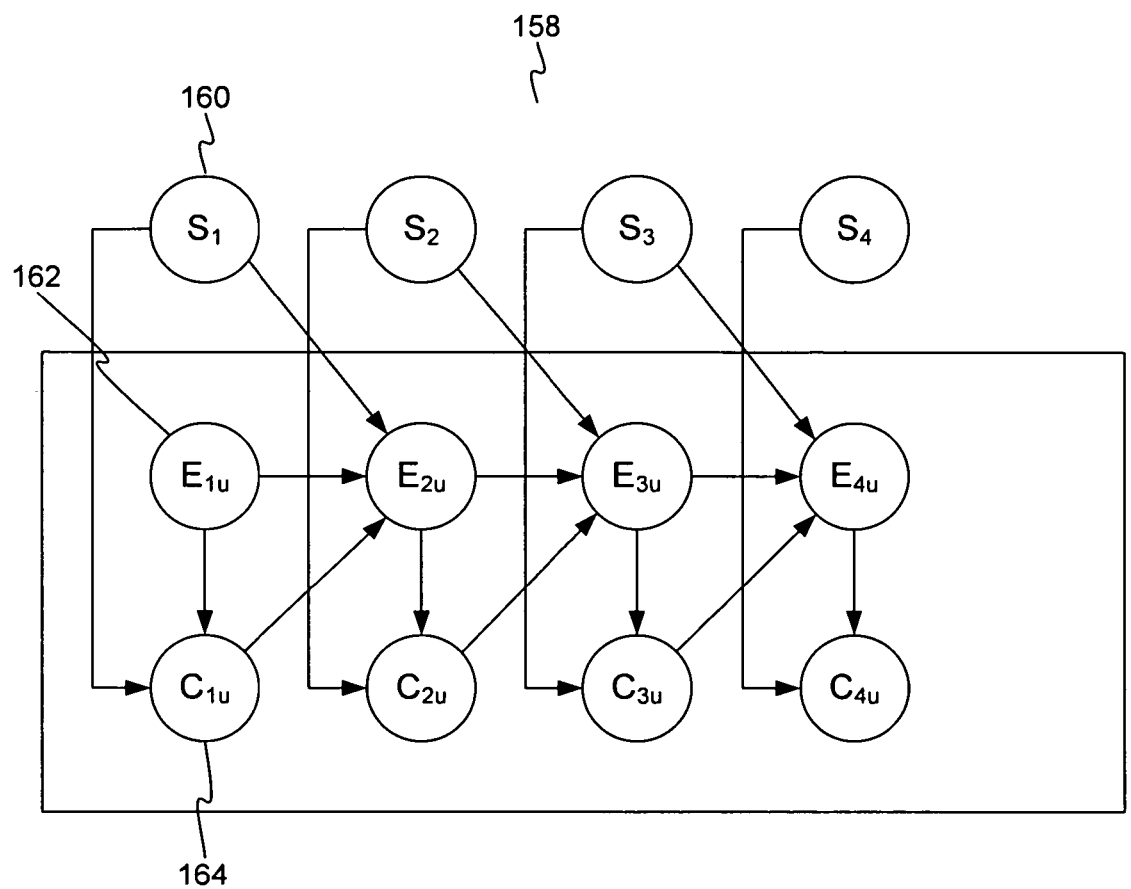
FIG. 5 shows a graphical model representation of a click chain model (CCM).

FIG. 5 shows a graphical model 158 representation of the CCM. Random variable $S_i$ 160 (ranging from 0 to 1) denotes the relevance of doc $d_i$, and Bernoulli variables $E_{i,u}$ 162 and $C_{i,u}$ 164 indicate whether the $d_i$ is examined and clicked by user u, respectively. The following explanation will omit subscript u for clarity where there is no ambiguity. All the $C_i$ variables 164 are observed from the click log, while the other variables ($E_i$ and $S_i$) are hidden variables whose posterior distribution are ultimately to be inferred. While FIG. 5 shows the dependencies, the set of conditional distributions are specified as follows:

No examination no click: $P(C_i=1|E_i=0)=0$;
Click or not depends on relevance: $P(C_i=1|E_i=1, S_i)=S_i$;
Sequential examination: $P(E_{i+1}=1|E_i=0)=0$;
Continue examination without click: $P(E_{i+1}=1|E_i=1, C_i=0)=\alpha_1$; and
Continue examination with click: $P(E_{i+1}=1|E_i=1, C_i=1, S_i)=\alpha_2(1-S_i)+\alpha_3 S_i$.

To complete the model specification, the following priors are placed on $P(E_i)$ and $S_i$'s:

$$P(E_1=1)=1 \quad (1),$$

$$p(S_i)=\mathbb{1}_{[0,1]}(S_i)\ i=1, 2, \quad (2).$$

Equation 1 implies that every user will examine the first doc in the SERP, and Equation 2 reflects placement of a uniform prior on each $S_i$ where $\mathbb{I}$ is the indicator function.

It should be noted that in the model specification, a limit was not put on the length of the chain structure. Instead the chain is allowed to go to infinity, while the probability of examining and clicking a page diminishes exponentially with its rank.

How to perform page relevance inference and parameter estimation for infinite chain length is described further below. If a finite chain length M is needed for practical reasons, it is possible to let variable $E_{M+1}=0$—which renders $E_j=C_j=0$ (j>M)—and adjust the inference formulae accordingly.

In the following subsection, the exact inference algorithm on CCM is elaborated, and its efficiency and scalability is theoretically proven.

Exact Inference on CCM

A central problem of model inference on a CCM is how to compute the posterior of the $S_i$'s, namely, $P(S_i|C^{1:U})$, given the observed click log entries $C^{1:U}$ from U users. Through a direct application of Bayes' Theorem, the following equation may be derived:

$$p(S_i|C^{1:U}) \propto p(S_i)\Pi_{u=1}^{U} P(C|S_i) \quad (3)$$

where independence between click log entries is assumed. Because the prior $p(S_i)$ is already known, $P(C_u|S_i)$ or $P(C|S_i)$ need only be computed when the superscript is safely dropped. Unfortunately, computing $P(C|S_i)$ for the graphical structure shown in FIG. 5 in general may not be analytically trackable as it might involve taking the sum (or integral, for continuous variables) over the other hidden variables. Therefore, approximate algorithms have been previously applied.

The inventors alone have observed several properties of the conditional probability of CCM, which may help to understand the feasibility of using a sum or integral approach.

1. If $C_j=1$ for some j, then $\forall i \leq j$, $E_i=1$.
2. If $E_j=0$ for some j, then $\forall i \geq j$, $E_i=0$, $C_i=0$.
3. If $E_i=1$, $C_i=0$, then $P(E_{i+1}|E_i, C_i, S_i)=\alpha_1^{E_{i+1}}(1-\alpha_1)^{1-E_{i+1}}$ does not depend on $S_i$.

Property 1 is that all the documents up to the last clicked one (if any) are examined, in which case, for each document before the last click position, the Markov blanket of its relevance variable S contains at most three variables. Property 2 is that if a page is not examined, the search session terminates and there is no further examination or click. As a result, the complexity of summing over n $E_i$'s is linear to n, rather than exponential in the general case (because each $E_i=0$ eliminates half of the possibility). Property 3 is a corollary from the definition of conditional probabilities $P(E_{i+1}|E_i, C_i, S_i)$. This property allows reordering of E's and S's to simplify computation.

By virtue of the three properties and using the conditional probabilities specified in the "User Behavioral Model" section above, the unnormalized posterior $P(C|S_i)$ may be presented in closed form in the following theorem.

TABLE 1

Un-normalized Posterior of $P(C|S_i)$

| I exists | Case | Conditions | Un-normalized Posterior |
|---|---|---|---|
| Yes | 1 | i < I, $C_i=0$ | $1 - S_i$ |
|  | 2 | i < I, $C_i=1$ | $S_i(1 - (1 - \alpha_3/\alpha_2)S_i)$ |
|  | 3 | i = I | $S_i\left(1 + \dfrac{\alpha_2 - \alpha_3}{2 - \alpha_1 - \alpha_2}S_i\right)$ |
|  | 4 | i > I | $1 - \dfrac{2}{1 + \dfrac{6 - 3\alpha_1 - \alpha_2 - 2\alpha_3}{(1-\alpha_1)(\alpha_2 + 2\alpha_3)}\left(\dfrac{2}{\alpha_1}\right)^{(i-I)-1}} S_i$ |
| No | 5 | i = 1 | $1 - S_i$ |
|  | 6 | i = 1 | $1 - \dfrac{2}{1 + (2/\alpha_1)^{i-1}} S_i$ |

Theorem 1 (Un-normalized Posterior). The un-normalized posterior $P(C|S_i)$ under priors in Equations 1 and 2 can be broken down to 6 cases as shown in Table 1, depending on the observed value of $C_i$ and the distance between i and the last click position if any.

Proof of Theorem 1 will now follow for each of the 6 cases in Table 1. With respect to each case, Property 1 informs that it is helpful to identify the last click position $I=\arg\max_j \{C_j=1\}$, so that all the $E_i=0$ ($i \leq I$). Each of the 6 cases are now discussed.

Case 1, i<I, $C_i=0$: By property 1, $E_i=1$, $E_{i+1}=1$. Moreover, $P(E_{i+1}=1|E_i=1, C=0, S_i)=\alpha_1$ does not depend on $S_i$. Since any constant with respect to $S_i$ can be ignored, therefore $$P(C'|S_i) \propto P(C_i=0|E_i=1, S_i)P(E_{i+1}=1|E_i=1, C_i=0, S_i) = (1-S_i)\alpha_1 \propto 1-s_i \quad (4).$$

Case 2, i<I, $C_i=1$: By property 1, $E_i=1$, $E_{i+1}=1$, the Markov blanket of $S_i$ consists of $C_i$, $E_i$ and $E_{i+1}$.

$$P(C|S_i) \propto P(C_i=1|E_i=1, S_i)P(E_{i+1}=1|E_i=1, C_i=1, S_i) \quad (5)$$
$$= S_i(\alpha_2(1-S_i) + \alpha_3 S_i)$$
$$\propto S_i(1 - (1-\alpha_3/\alpha_2)S_i)$$

Case 3, i=I: By Property 1, the Markov blanket of $S_i$ does not contain any variable before position i, and also it is known that $C_i=1$, $E_i=1$ and $\forall j>i$, $C_j=0$. The sum/integration is taken over all the E, S variables and can be performed as follows:

$$P(C|S_i) \propto P(C_i|E_i, S_i)p(C_{>i}|C_i, E_i, S_i) \quad (6)$$
$$= P(C_i=1|E_i=1, S_i)\sum_{E_j>i}\int_{S_j>i}\prod_{j>i} P(E_j|E_{j-1},$$
$$C_{j-1}, S_{j-1}) \cdot p(S_j)P(C_j|E_j, S_j)$$
$$= S_i \cdot \{P(E_{i+1}=0|E_i=1, C_i=1, S_i) \cdot 1 +$$
$$P(E_{i+1}=1|E_i=1, C_i=1, S_i) \cdot$$
$$\left(\int_0^1 p(S_{i+1})P(C_{i+1}=0|E_{i+1}=1, S_{i+1})dS_{i+1}\right) \cdot$$
$$\{P(E_{i+2}=0|E_{i+1}=1, C_{i+1}=0) \cdot 1 +$$
$$P(E_{i+2}=1|E_{i+1}=1, C_{i+1}=0) \cdot$$
$$\left(\int_0^1 p(S_{i+2})P(C_{i+2}=0|E_{i+2}=1, S_{i+2})dS_{i+2}\right) \cdot$$
$$\{\ldots\}\}\}$$
$$= S_i((1-\alpha_2(1-S_i) - \alpha_3 S_i) + (\alpha_2(1-S_i) + \alpha_3 S_i) \cdot$$

-continued $$\frac{1}{2} \cdot \left((1-\alpha_1) + \alpha_1 \cdot \frac{1}{2} \cdot (\ldots)\right)$$

$$= S_i \left((1-\alpha_2(1-S_i) - \alpha_3 S_i) + (\alpha_2(1-S_i) + \alpha_3 S_i)\right.$$

$$\left.\frac{1}{2} \cdot \frac{1-\alpha_1}{1-\alpha_1/2}\right)$$

$$\propto S_i \left(1 + \frac{\alpha_2 - \alpha_3}{2 - \alpha_1 - \alpha_2} S_i\right)$$

Case 4, i>I: Now the result will be a function of k=i−I—(the offset of the page from the last click position). The approach to sum over S and E variables is similar to Case 3, but with integration of the outmost $S_i$ and keep a $S_i$ inside without the integration. S will be used to replace $S_i$ in the following equation for easier reading:

$$P_{C_I=1, i-I=k}(C \mid S_i) \propto \begin{cases} \int_0^1 S((1-\alpha_2(1-S)-\alpha_3 S) + (\alpha_2(1-S)+\alpha_3 S)) \cdot (1-S_i) \cdot \frac{1-\alpha_1}{1-\alpha_1/2} dS & k=1 \\ \int_0^1 S((1-\alpha_2(1-S)-\alpha_3 S) + (\alpha_2(1-S)+\alpha_3 S)) \cdot \left(\frac{1-\alpha_1}{2} \sum_{j=0}^{k-2} (\alpha_1/2)^j + (\alpha_1/2)^{k-1}(1-S_i)\frac{1-\alpha_1}{1-\alpha_1/2}\right) dS & k>1 \end{cases} \quad (7)$$

$$= \int_0^1 S((1-\alpha_2(1-S)-\alpha_3 S) + (\alpha_2(1-S)+\alpha_3 S)) \cdot \frac{(1-\alpha_1)(1+(\alpha_1/2)^{k-1} - 2(\alpha_1/2)^{k-1} S_i)}{2-\alpha_1}$$

$$\propto 1 - \frac{2}{1 + \frac{6 - 3\alpha_1 - \alpha_2 - 2\alpha_3}{(1-\alpha_1)(\alpha_2 + 2\alpha_3)}(2/\alpha_1)^{k-1}} S_i \quad (k \geq 1)$$

Case 5, i=1 (No click): The difference between i=1 and i>1 is that $E_1=1$ is known, therefore $P(E_2|E_1=1, C_1=0)$ does not depend on $S_1$, and $$P(C|S_i) \propto P(C_i=0|E_i=1, S_i) = 1 - S_i \quad (8)$$

Case 6, i=1: This is similar to Case 4, but the derivation is simpler and $\alpha_2$, $\alpha_3$ are no longer in the formula:

$$P_{C_I=0, i-I=k}(C \mid S_i) \propto \int_0^1 (1-S) dS \left((1-\alpha_1) \cdot \sum_{j=0}^{k-1} (\alpha_1/2)^j + \right. \quad (9)$$

$$\left.(\alpha_1/2)^{k-1} \alpha_1 (1-S_i) \frac{1-\alpha_1}{1-\alpha_1/2}\right)$$

$$\propto (1-\alpha_1) \frac{1-(\alpha_1/2)^k}{1-\alpha_1/2} + 2(\alpha_1/2)^k (1-S_i) \frac{1-\alpha_1}{1-\alpha_1/2}$$

$$\propto 1 - \frac{2}{1 + (2/\alpha_1)^k} S_i \quad (k \geq 1)$$

Theorem 1 presents the closed form of the un-normalized posterior $P(C|S_i)$, and interestingly, each of the cases can be written in the form of $S_i^{C_i}(1-\beta S_i)$ where $\beta$ is a case-dependent coefficient and may depend on the distance (i−I) as well. With this theorem, it is straightforward to extend to $P(C^{1:U}|S_i)$, and finally use it to compute the un-normalized $P(S_i|C^{1:U})$ using Equation 3.

Once the un-normalized $P(S_i|C^{1:U})$ is computed, it is straightforward to normalize it, and to calculate a certain statistical measure as an indicator of the document $d_i$ being perceived as relevant to the user with respect to the query q. For example, the mean of $P(S_i|C^{1:U})$ can be taken as the relevance indicator, and its inverse standard deviation (precision) can be taken as confidence.

Theorem 1 also makes it clear as to how to update the posterior once a new click log entry $C^{U+1}$ comes. First check if there is any click in this entry: if yes, for each position i, determine which of the first 4 cases applies and get the corresponding term T by checking the relationship between i and I, and the value of $C_i$ if i<I. Then, multiply the already-computed posterior $P(S_i|C^{1:U})$ with T, normalize the product, and compute the mean and variance as the indicator of U+1 users' perceived relevance. To further illustrate the process of posterior update, consider an example in the following subsection. The example will also help understand which documents are promoted or demoted given a click chain.

TABLE 2

Illustrative Example

| | Impression | Click Chain |
|---|---|---|
| $I_1$ | $d_1, d_2, d_3, d_4, d_5$ | XOXOO |
| $I_2$ | $d_1, d_3, d_2, d_4, d_5$ | OXOOO |
| $I_3$ | $d_1, d_3, d_2, d_4, d_5$ | OOOOO |

Consider an example to illustrate the computability of CCM. Let M=5 and assume the three SERP impressions shown in Table 2, where 'o' and 'x' stand for 'skip' and 'click', respectively. Notice that $d_3$ moves to the second place in $I_2$. This, in the first place, simulates the instability of SERPs and, in the second place, considers what happens when CCM is deployed: the ranking of the top-M documents could change across time.

With the default parameter setting $\alpha_1=0.6$, $\alpha_2=0.8$, $\alpha_3=0.3$, Table 1 is materialized as shown in Table 3. With M=5, there are at most four terms needed for cases 4 and 6. These terms reveal how the CCM promotes and demotes the relevance of each document based on whether it is clicked or not and its relative position to others.

TABLE 3

Instantiated Un-normalized Posterior of $P(C|S_i)$

| I exists | Case | Conditions | Un-normalized Posterior |
|---|---|---|---|
| Yes | 1 | i < I, $C_i$ = 0 | 1 − $S_i$ |
| | 2 | i < I, $C_i$ = 1 | $S_i(1 - .63S_i)$ |
| | 3 | i = I | $S_i(1 + .83S_i)$ |
| | 4 | i > I | 1 − .33$S_i$, 1 − .11$S_i$, 1 − .04$S_i$, 1 − .01$S_i$ |

TABLE 3-continued

Instantiated Un-normalized Posterior of $P(C|S_i)$

| I exists | Case | Conditions | Un-normalized Posterior |
|---|---|---|---|
| No | 5 | i = 1 | $1 - S_i$ |
|  | 6 | i > 1 | $1 - .46S_i, 1 - .17S_i, 1 - .05S_i, 1 - .02S_i$ |

Figure 6:
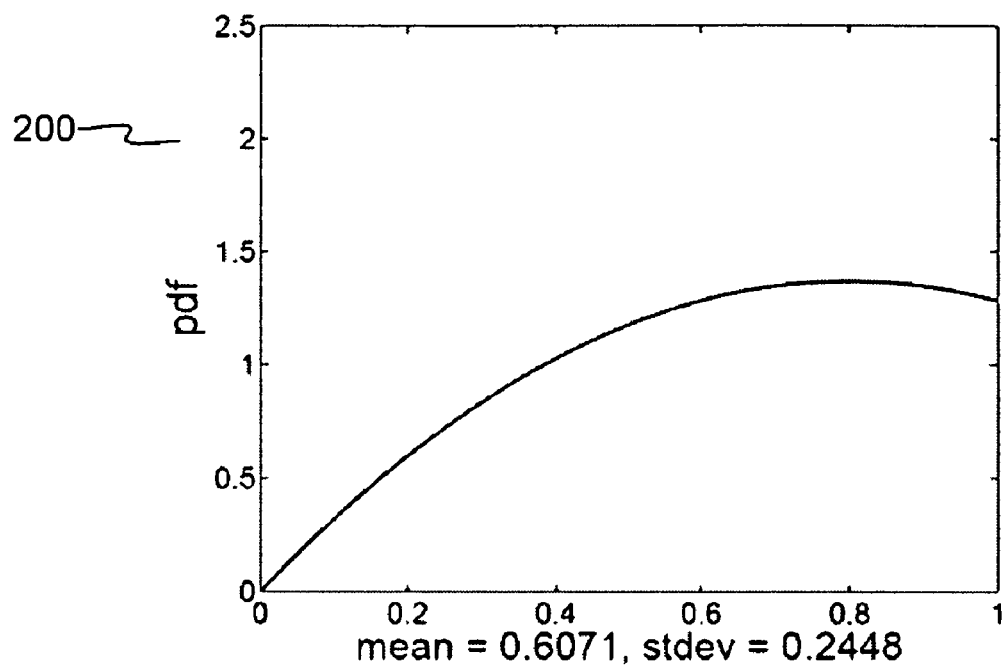
FIG. 6 shows probability distribution functions.
Figure 6:
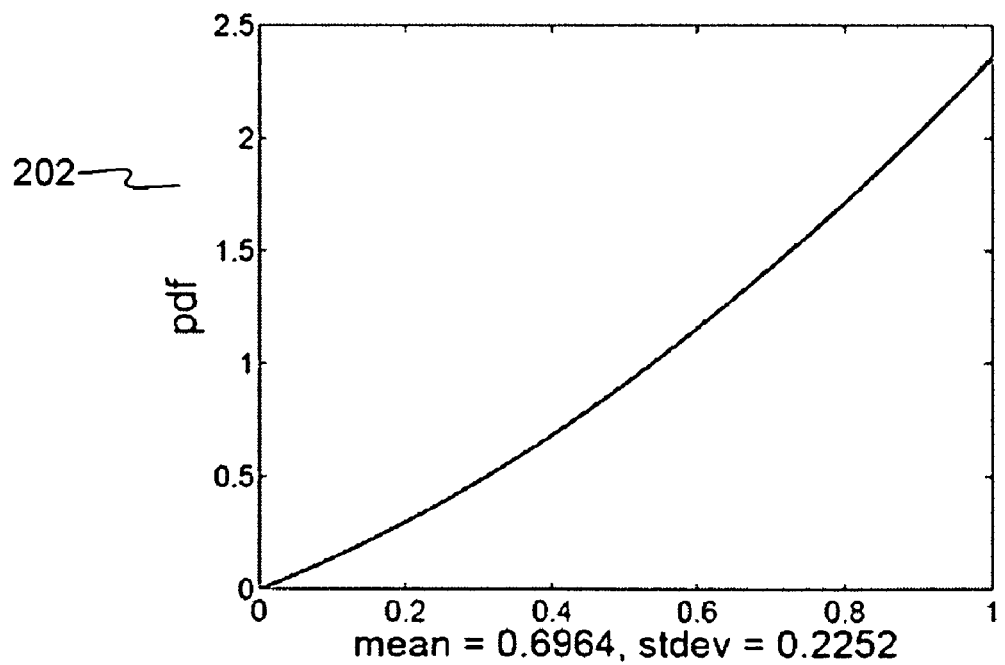

Note that non-clicked documents are demoted: $(1-\beta S)$ $(\beta>0)$ means demotion because it suppresses more for larger S once it is multiplied to the existing posterior. A larger $\beta$ results in a more severe penalty. Based on the previous point, skipped documents before the last click position are penalized the most. The first document for whole-page-no-click is also most penalized because the $P(E_1=1)=1$ is adopted as the prior. Furthermore, documents after the last click position are penalized less and less, because each of them has a decreasing probability of being examined, and since there is no click, the negative effect on relevance is weaker and weaker. As can be seen, the update becomes roughly $(1-0.01S)$, four positions after the last click. Case 6 is similar to Case 4. Finally, consider FIG. 6. FIG. 6 shows a probability distribution function (PDF) for Case 2 200 (non-last-clicked document) and a PDF for Case 3 202 (last-clicked document). As can be seen, clicked documents are promoted (Case 2), and the last-clicked document is promoted the most (Case 3).

Understanding which documents the CCM promotes and demotes can help in fine tuning of the model and adapting it to practice. For example, if practice suggests that skipped documents before last click position are penalized too much, or the last clicked document is promoted too much, the CCM can be adjusted by introducing corresponding priors.

Figure 7:
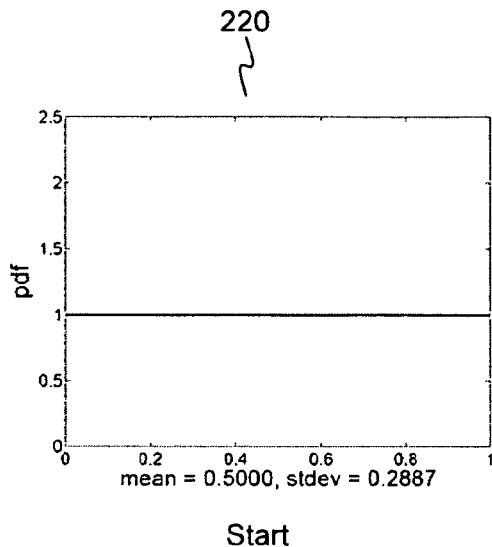
FIG. 7 shows evolution of a normalized posterior of an example document.
Figure 7:
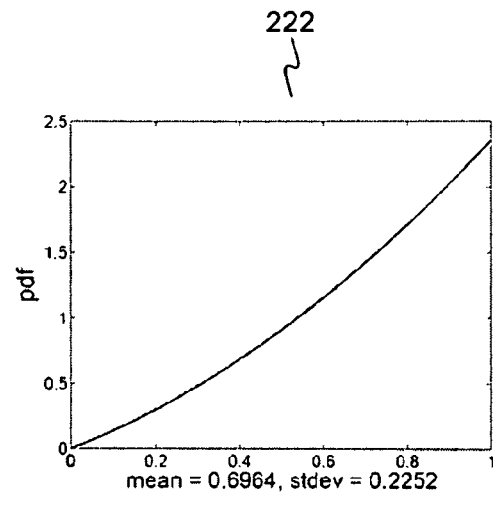
Figure 7:
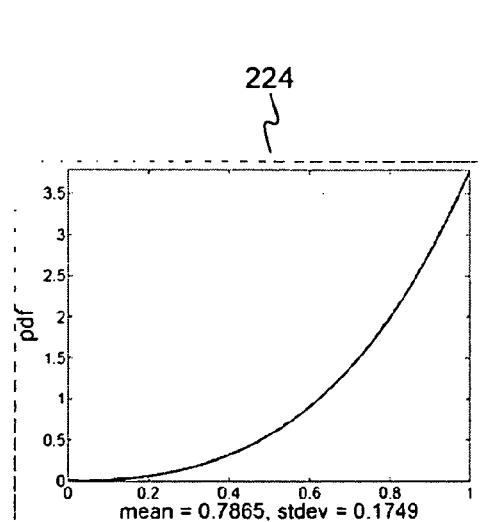
Figure 7:
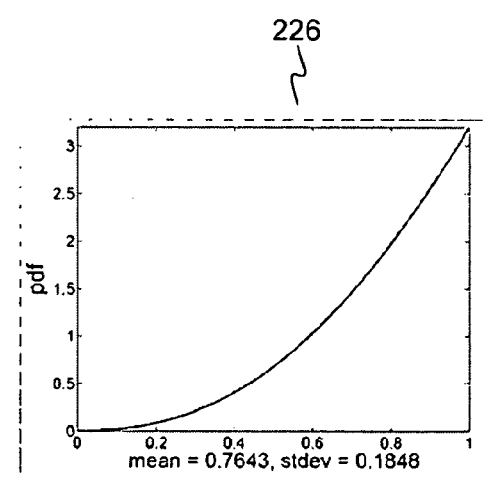
Figure 8:
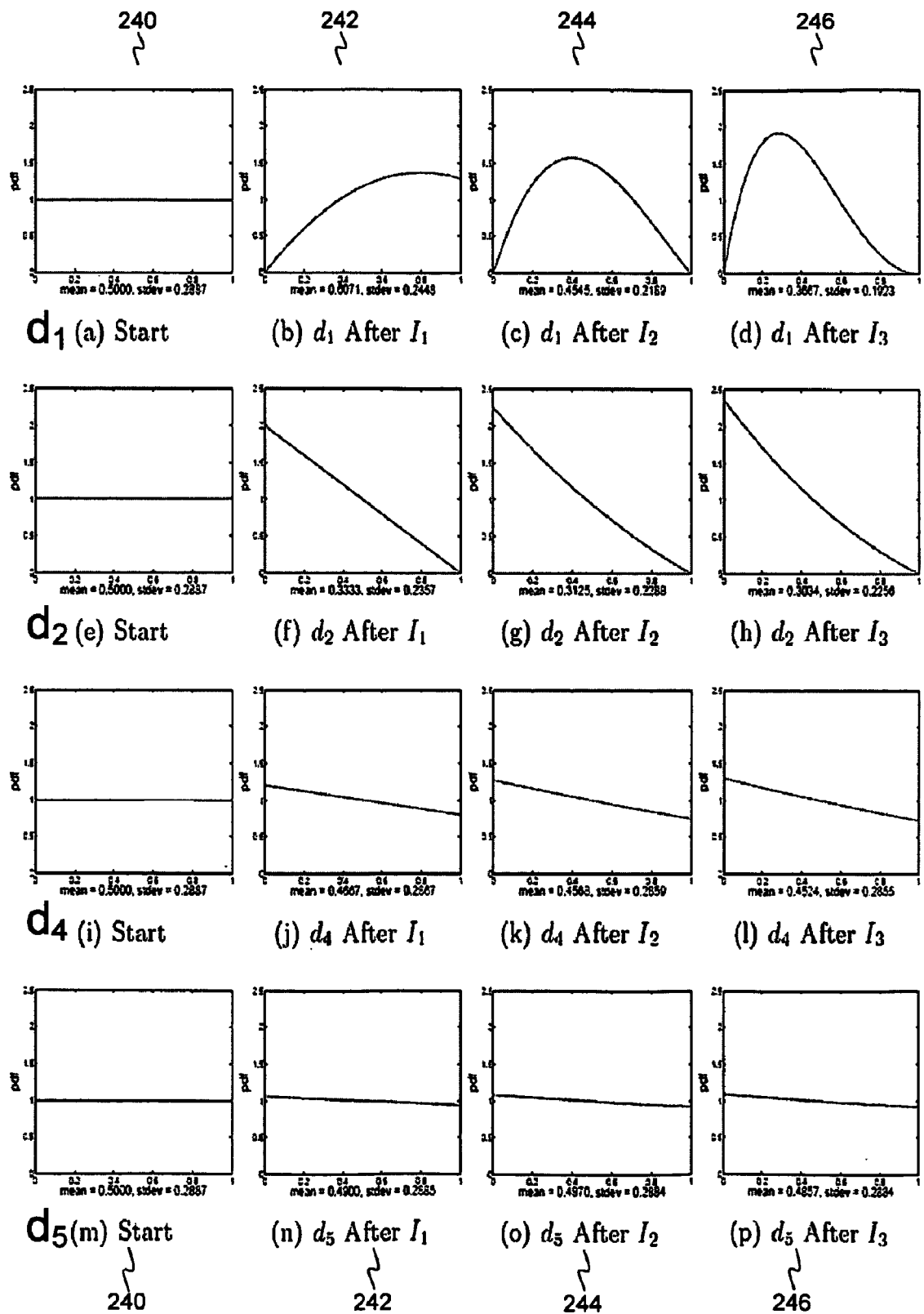
FIG. 8 shows how the normalized posteriors for 5 documents evolve from start to different iterations.

How the posterior of $d_3$ is updated with each impression and click chain is now discussed. FIG. 7 shows how the normalized posterior of $d_3$ evolves at start 220, after $I_1$ 222, after $I_2$ 224 and after $I_3$ 226. FIG. 8 shows how the normalized posteriors for $d_1$, $d_2$, $d_4$, and $d_5$ evolve from start 240, to $I_1$ 242, to $I_2$ 244, and to $I_3$ 246. Without any click data, the probability for $d_3$ to be relevant is uniform, which is the uninformative prior of FIG. 8, PDF (m) (the "Start" graph of $d_5$). In $I_1$, it is known that $d_3$ is the last clicked position, and falls into Case 3, so its un-normalized posterior becomes $s(1+0.83s)$, as shown in FIG. 8, PDF (n) (the "After $I_1$" graph of $d_5$). This reveals that $d_3$ is more likely to be relevant ($\mu 3=0.6964$ instead of 0.5000). But, since a single click chain cannot be completely affirmative, its standard deviation $\sigma 3=0.2252$ reveals this point. Similarly, in $I_2$, $d_3$ is again the last clicked document, so its un-normalized posterior is $s2(1+0.83s)2$ with its normalized distribution plotted in FIG. 8, PDF (o). Finally, in $I_3$, which has no clicks, $d_3$ falls into Case 6 because it is not the first document, and hence gets the $(1-0.46s)$ term. So the posterior of $d_3$ after three click chains becomes $s^2(1+0.83s)^2(1-0.46s)$, as plotted in FIG. 8, PDF (p). The mean (0.7643) and standard deviation (0.1848) of $d_3$ can be then taken as indicators of $d_3$'s relevance.

Following the same route, it is possible to figure out the posterior for other documents. Table 4 lists the posterior updating process for each document

TABLE 4 un-normalized posterior

| Posterior | Initial | After $I_1$ | After $I_2$ | After $I_3$ |
|---|---|---|---|---|
| $P(S_1)$ | 1 | $s(1 - .63s)$ | $s(1 - .63s)(1 - s)$ | $s(1 - .63s)(1 - s)^2$ |
| $P(S_2)$ | 1 | $(1 - s)$ | $(1 - s)(1 - .33s)$ | $(1 - s)(1 - .33s)(1 - .17s)$ |
| $P(S_3)$ | 1 | $s(1 + .83s)$ | $s^2(1 + .83s)^2$ | $s^2(1 + .83s)^2(1 - .46s)$ |
| $P(S_4)$ | 1 | $(1 - .33s)$ | $(1 - .33s)(1 - .11s)$ | $(1 - .33s)(1 - .11s)(1 - .05s)$ |
| $P(S_5)$ | 1 | $(1 - .11s)$ | $(1 - .11s)(1 - .04s)$ | $(1 - .11s)(1 - .04s)(1 - .02s)$ | after each impression. Take $d_1$ for an example. It is Case 2 in $I_1$ (hence promoted), and Case 1 in $I_2$ (hence demoted), and Case 5 in $I_3$ (demoted again), ending up with the posterior $s(1-0.63s)(1-s)^2$. The update process is plotted in FIG. 8. If $\mu-\sigma$ is used as the quantifier of relevance, the re-ranking would be $d_3$, $d_5$, $d_1$, $d_4$, $d_2$. This is reasonable in that $d_3$ is promoted because it is the last clicked doc in $I_1$ and $I_2$ and $d_2$ is demoted because it is never clicked given the premium real estate. Although putting $d_5$ to the second place may not seem to make sense, this is actually a reasonable mechanism to test users' taste (or possibly increase diversity): if $d_5$ is not clicked much, it will soon drop off. Any concern about the ranking instability can be eased because in practice the standard deviation will be used to control when to commit the re-ranking (e.g., only documents with $\sigma \leq \mathbf{Q}$ are re-ranked), and usually given large data, the ranking should be stable unless users' interests really change, which invokes click pattern changes, and hence the re-ranking. In sum, the CCM tracks users' click preferences, and adjusts ranking accordingly.

Extensions to the CCM

The section above elaborates on the basic Click Chain Model, which assumes that the U click log entries are with respect to the same SERP, which often may not hold true in practice—for example, search engines are often updated and the selection and ranking of documents that match a given query may change as the search engine is updated. In this subsection, how to extend the basic CCM for some practical considerations is explained.

In practice, the SERP, even the first search result, can change from impression to impression across time, which seems to completely wrap out the CCM. But the basic CCM readily extends to practical SERPs, where previously unseen documents can climb into the top-M documents and previously seen documents can appear in different orders in different SERPs.

The capability of the CCM to handle such cases relies on the interpretation of $S_i$: throughout the discussion above in the "BASIC CCM" section, nowhere was it mentioned that $S_i$ is attached with the position i, but instead, $S_i$ is associated with the document $d_i$. Therefore, $S_i$ denotes the relevance of $d_i$, and travels with $d_i$ if $d_i$ moves around within or out of the top-M. In this way, the CCM can handle a variety of real-world click logs. Namely, given a click log entry, for each position i, find corresponding term based on Table 1, and multiply the term to the already-computed posterior of the document that appears in the i-th position in the click log entry. First, if the document is previously unseen, its (un-normalized) posterior is simply the term. Secondly, the derivation above in the "BASIC CCM" section is based on the priors described by Equations 1 and 2, but neither equation is essential to the CCM. For example, the prior $P(E_i=1)=1$ can be waived if the first result is not always examined by users in certain applications. Or, different non-uniform priors can be imposed on $S_i$'s if needed. Finally, the CCM can be built for a set of semantically similar queries, instead of for each individual query. The idea is to equalize a set of queries, merge their click log entries and equalize documents if needed, and learn a CCM. This may make the CCM more robust and reduce the risk of data sparsity for rare tail queries. Note, however, that this approach could be sensitive to the quality of identifying equivalent queries and documents.

Experimental Results

Some experiments have been performed to probe the value of the CCM described herein. Consider specifically the problem of ClickBoost, i.e., how to re-rank the top documents based on user clicks. ClickBoost is described elsewhere. A common belief is that re-ranking in descending order of the number of clicks received by each document would be a good or even optimal approach (referred to herein as the "NumClick" approach), but experimentation shows that it is actually not true, and CCM-based re-ranking (ranking in descending order of the inferred document relevance) significantly outperforms the NumClick approach. Specifically, all the click chains of 10,118 unique queries were obtained (with query frequencies between 100 and 400) from a production click chain log. For each query, the first three quarter click chains were used to fit the model and evaluate the quality of the re-ranking by replaying the remaining one quarter click chains. Quality was measured by pSkip (described elsewhere).

Results showed that among the 10,118 queries, CCM won on 7,124 queries while the naive approach won on 143 queries, and the rest are ties (2,851 queries), which shows that CCM is significantly better than the NumClick approach, as indicated by a statistical test and as shown by these numbers.

Even in comparison with re-ranking based on pSkip (described elsewhere) and using pSkip as the quality measure—which disadvantages the CCM—the CCM still outperforms pSkip-based re-ranking. The CCM won on 3,760, and pSkip-ranking won 1,821, and the remaining 4,537 were ties, showing a statistically significant advantage.

The demonstrated benefit of CCM for the practical ClickBoost problem suggests applicability of the CCM to other practical problems that use relevance of documents to queries, or other terms.

CONCLUSION

Described above are approaches for using a CCM to infer relevancies of documents as perceived by users with respect to queries. By virtue of the CCM's solid theoretical foundation and promising computational properties, the CCM is efficient and scales easily to many real-world data processing problems, as discussed next.

The CCM may be used for automated fine tuning of a search engine. Top-part ranking can be automatically adjusted based on inferred user-perceived relevance from user clicks. The CCM may be used for adaptive search. When the meaning of a query changes across time, user click patterns also change, and based on inferred relevance, an adaptive search engine can be developed. The CCM may also improve search diversity. When a query has multiple meanings, users with different information needs will cast preference on different documents. Inferred relevance may bring up the most relevant documents for different information needs. The CCM may also help as a "judge of the judges". Inferred first-party relevance judgment could be contrasted/reconciled with Human Relevance System (HRS) for improved quality. The CCM may be used to retrain a search ranker. Instead of training a search ranker based on third-party judgment (from HRS), a search ranker could be re-trained based on the inferred relevance, which reflects first-party judgments. The CCM may also be used for computing search quality metrics. Because a major component of user satisfaction is search relevance, the inferred relevance can be used to compose a search quality metric, which correlates with end users' satisfaction. Search user modeling may also be performed using the CCM. Based on an assumption that users with the same/similar perception of a document's relevance are likely similar in nature, various downstream applications based on user modelings may be accomplished through inferred relevance. There are applications in Ad business as well; e.g., as a "judge of the judges", for computing ad quality metrics, etc.

Embodiments and features discussed above can be realized in the form of information stored in volatile or non-volatile computer or device readable storage media. This is deemed to include at least media such as optical storage (e.g., CD-ROM), magnetic media, flash ROM, etc. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method of computing relevancies of documents to queries submitted to a search engine software server hosted on one or more server computers that are configured to receive the queries via a network from client computers, the one or more server computers also being configured to return via the network to the client computers search results configured to be displayed on the client computers, a search result comprising a listing of documents in an order according to relevance to a corresponding query as determined by the search engine, the method comprising:

accessing a click chain model (CCM) inference engine, the CCM inference engine having been trained with a click chain log comprising click chains each indicating which documents at which respective order positions of a corresponding particular search result were clicked or not clicked by a user that viewed the particular search result, where the CCM inference engine models the click chains such that, for a given query and a corresponding search result comprising a given document and a document preceding the given document, a probability of a user examining the given document in the given search result conditionally depends directly on a first probability, a second probability, and a third probability, where:

the first probability comprises a probability that the preceding document is examined by a user viewing the given search result;

the second probability comprises a probability that the preceding document is clicked on by a user viewing the given search result;

the second probability conditionally depends directly on the first probability;

the second probability conditionally depends directly on the third probability;

the third probability comprises a probability of the preceding document being relevant to the user with respect to the given query; and receiving a new query from a client at the search engine, using the CCM inference engine to contribute to computation of relevancies of matching documents to the new query, and returning to the client a search result where the matching documents are ranked according to the relevancies, whereby the matching documents are ranked at least in part according to the CCM inference engine.

2. A method according to claim 1, wherein the CCM inference engine comprises a Bayesian inference engine.

3. A method according to claim 1, wherein a fourth probability, comprising a probability that the given document is clicked by a user viewing the search result, conditionally depends directly on both the probability that the given document is examined and a fifth probability, the fifth probability comprising a probability of the given document being perceived as relevant by the user with respect to the query.

4. A method according to claim 3, wherein the CCM inference engine also models a sixth probability comprising a probability that a document succeeding the given document in the given search result is examined, wherein the sixth probability conditionally depends directly on,
the probability that the given document is examined, the fourth probability, and
a seventh probability comprising a probability of the preceding document being relevant to the user with respect to the query.

5. A method according to claim 4, wherein a posterior differs depending on whether or not the given document was or was not clicked in the given search result.

6. A method according to claim 4, wherein the CCM inference engine guarantees convergence to a true value of a posterior.

7. A method according to claim 1, wherein the CCM inference engine models a click chain as a dependency graph of random variables and edges of the graph correspond to the probabilities.

8. One or more computer-readable storage media storing information configured to enable a computing device to perform a process of computing probabilities that respective documents are relevant to a query submitted to a search engine that receives queries from client computers, wherein the computer-readable storage media is not a signal, the search engine returning to the client computers search results for the queries, a search result comprising a listing of documents ordered according to relevance to a corresponding query as computed by the search engine, the process comprising:
modeling click chains in an inference engine as conditional probabilities by training the inference engine with a set of observed click chains, each click chain indicating which documents at which respective order positions of a corresponding particular search result were clicked or not clicked by a user that viewed the particular search result, where, given a query and a search result having a first document and a second document preceding the first document, the conditional probabilities include:
a first probability comprising a probability that a user examines the first document in the search result for the given query,
a second probability comprising a probability that a user clicks on the second document in the search result for the query, and
a third probability comprising a probability of the second document being relevant to the query,
wherein the second probability is conditionally dependent on the third probability, and
wherein the first probability is conditionally dependent on the third probability;
ranking results of the query by using the inference engine to contribute to the computation of probabilities that the documents are relevant to the query, where the documents are ranked according to the probabilities, whereby the documents are ranked at least in part according to the inference engine; and
returning the ranked results to a client computer.

9. One or more computer-readable storage media according to claim 8, wherein the second probability is also conditionally dependent on a fourth probability.

10. One or more computer-readable storage media according to claim 9, wherein the first probability is conditionally dependent on the fourth probability.

11. One or more computer-readable storage media according to claim 8, wherein the click chains correspond to respective previous queries that were logged by the search engine when handling previous queries.

12. One or more computer-readable storage media according to claim 11, wherein a logged click chain of a search result is modeled as a click and examination behavior of a user where the user is assumed to examine a current document abstract, if the user clicks a document corresponding to the current document abstract then after viewing the document the user either returns to examine a next abstract of the search results or is done viewing the search result, and if the user does not click the document corresponding to the document abstract then the user either returns to examine a next abstract of the search results or is done viewing the search result.

13. One or more computer-readable storage media according to claim 8, wherein the second document is a most relevant listing in the search result and is assumed to have a probability of 1 that it is examined by a user.

14. A computing device comprising a processor and computer-readable storage media storing information configured to enable the computing device to perform a process of computing probabilities that respective documents are relevant to a query submitted to a search engine that receives queries from client computers, the search engine returning to the client computers search results for the queries, a search result comprising a listing of documents ordered according to relevance to a corresponding query as computed by the search engine, the process comprising:
accessing an inference engine, the inference engine having been trained with a set of observed click chains, the inference engine modeling user click behavior as a probabilistic dependence graph comprising nodes representing random events and edges representing conditional dependencies between the random events, the graph comprising:
a first node representing a first probability comprising a probability that a user examines a first document in a search result for a query,
a second node representing a second probability comprising a probability that a user clicks on a second document in the search result for the query,
a third node representing a third probability comprising a probability of relevance of the second document to the query,
wherein the first probability is conditionally dependent on the third probability, the second probability is conditionally dependent on the third probability, and the first probability is conditionally dependent on the second probability,
a first edge between the second and third node representing a conditional dependency of the second node on the third node,
a second edge between the first and third node representing a conditional dependency of the first node on the third node, and a third edge between the second and third node representing a conditional dependency of the third node on the second node; and receiving a new query from a client at the search engine, using the inference engine to compute probabilities of relevance of matching documents determined by the search engine to match the new query, and returning to the client a search result where the matching documents are ranked according to the computed probabilities of relevance of the matching documents.

15. A device according to claim 14, wherein the inference engine is modeled based on there being a zero probability of a user examining the first document if the user did not examine the second document, the second document preceding the first document in the corresponding search result.

16. A device according to claim 14, wherein the inference engine is modeled based on there being a zero probability of a user examining the second document if the user did not click the second document.

17. A device according to claim 14, wherein, the second document precedes the first document in the search result, and the inference engine is modeled based on a fourth probability comprising a probability of user examination of the second document, when it is known that a user clicked the first document in the search result, being dependent on the third probability.

18. A device according to claim 14, wherein some nodes correspond to click observations from the set of click chains, and where other nodes correspond to hidden random variables whose posterior distribution is to be inferred by the inference engine.

19. A device according to claim 14, wherein the modeling provides non-zero probabilities of examining documents in the search result that are after a lowest document in the search result that was clicked.

* * * * *